(12) United States Patent
Hunter et al.

(10) Patent No.: US 7,409,597 B2
(45) Date of Patent: *Aug. 5, 2008

(54) PROCESSOR BUS FOR PERFORMANCE MONITORING WITH DIGESTS

(75) Inventors: Hillery C. Hunter, Deerfield, IL (US); Ravi Nair, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/775,676

(22) Filed: Jul. 10, 2007

(65) Prior Publication Data

US 2008/0016399 A1 Jan. 17, 2008

Related U.S. Application Data

(63) Continuation of application No. 10/775,393, filed on Feb. 10, 2004, now Pat. No. 7,284,158.

(51) Int. Cl.
*G06F 11/00* (2006.01)

(52) U.S. Cl. .......................................... 714/39; 714/47

(58) Field of Classification Search .................... 714/39, 714/47, 37, 43, 15–16, 56
See application file for complete search history.

(56) References Cited

U.S. PATENT DOCUMENTS

| | | | |
|---|---|---|---|
| 5,146,461 A * | 9/1992 | Duschatko et al. ........... | 714/772 |
| 5,151,981 A * | 9/1992 | Westcott et al. ............... | 714/50 |
| 6,026,354 A * | 2/2000 | Singh et al. .................. | 702/186 |
| 6,115,791 A * | 9/2000 | Collins et al. ............... | 711/122 |
| 6,311,255 B1 * | 10/2001 | Sadana ........................ | 711/152 |
| 6,385,274 B1 * | 5/2002 | Nohara ......................... | 377/20 |
| 6,898,261 B1 * | 5/2005 | Hunter et al. ................. | 377/15 |
| 7,051,131 B1 * | 5/2006 | Wiedenman et al. ........ | 710/107 |
| 7,107,494 B1 * | 9/2006 | Tischler ....................... | 714/43 |
| 7,284,158 B2 * | 10/2007 | Hunter et al. ................. | 714/39 |

OTHER PUBLICATIONS

Cameron, "Emperical and Statistical Application Modeling Using On-chip Performance Monitors," PhD Thesis, Louisiana State University, Aug. 2000.

Zagha, et al., "Performance Analysis Using the MIPS R10000 Performance Counters", In Proceedings of Supercomputing '96, Nov. 1996.

\* cited by examiner

*Primary Examiner*—Dieu-Minh Le

(57) ABSTRACT

A method for monitoring event occurrences from a plurality of processor units at a centralized location via a dedicated bus coupled between the plurality of processor units and the centralized location. In particular, the method comprises receiving, at the centralized location, data indicative of cumulative events occurring at one of the processor units, and storing the data in a first temporary memory. The data is then stored in a register based on a tag identifier affixed to the data in an instance where the tag identifier provides indicia of one of the plurality of processor units.

20 Claims, 13 Drawing Sheets

PROCESSOR BUS FOR PERFORMANCE MONITORING WITH DIGESTS

CROSS REFERENCE TO RELATED APPLICATIONS

This application is a continuation of U.S. patent application Ser. No. 10/775,393, filed Feb. 10, 2004 now U.S. Pat. No. 7,284,158, which is herein incorporated by reference in its entirety. Application Ser. No. 10/775,393 is related to U.S. patent application Ser. No. 10/725,153, filed Dec. 1, 2003, which is also herein incorporated by reference in its entirety.

FIELD OF THE INVENTION

The present invention relates generally to a method and apparatus for monitoring occurrences of events in a computing system, and more specifically for gathering and disseminating monitored events associated with computer hardware and software in a systematic manner.

BACKGROUND OF THE INVENTION

Description of the Related Art

It is often important to monitor the performance of a hardware device and/or a software application, e.g., a processor executing a software application. Such monitoring may include the detection of the occurrence of certain events, e.g., misses in a cache, overflows in buffers, functional unit utilization, and so on. Monitoring these events provides insights into the performance of the hardware device and/or software application. For example, a hardware designer may use such records to perform trouble shooting functions or to get ideas about improving the design, while a software designer may use the same to identify inefficiencies in programs, and hence to improve its performance.

Currently, performance monitoring is done in an ad hoc manner. For example, a shared bus may be utilized to gather information from multiple events occurring contemporaneously, as well as transfer information associated with other processor functions not associated with performance monitoring. Utilizing a shared bus incurs delays, as the performance monitoring information may take lower priority to other processor tasks being performed via the shared bus. Thus, traffic delays on the shared bus may skew subsequent actions based on the delayed monitored information.

Therefore, there is a need for a method and apparatus for monitoring occurrences of events and disseminating gathered information to hardware, software, or a human user.

SUMMARY OF THE INVENTION

The disadvantages heretofore associated with the prior art are overcome by the present invention of a first method for monitoring event occurrences from a plurality of processor units at a centralized location via a dedicated bus coupled between the plurality of processor units and the centralized location. In particular, the method comprises receiving, at the centralized location, data indicative of cumulative events occurring at one of the processor units, and storing the data in a first temporary memory. The data is then stored in a register based on a tag identifier affixed to the data in an instance where the tag identifier provides indicia of one of the plurality of processor units.

In a second embodiment, a second method is provided for monitoring event occurrences using a register having at least one capture bit with a plurality of storage bits, at least one logic operator, and a counter. The second method comprises computing, at the at least one logic operator, a single cumulative event signal from a plurality of input event signals indicative of respective occurrences of monitored events by the register. The cumulative event signal is captured into the at least one capture bit of the register, wherein the cumulative event signal is received at a first frequency. Thereafter, the stored cumulative event signal is shifted in the at least one capture bit to one of the plurality of storage bits in accordance with a shift rate signal, wherein the shift rate signal is received at a second frequency.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Figure 1:
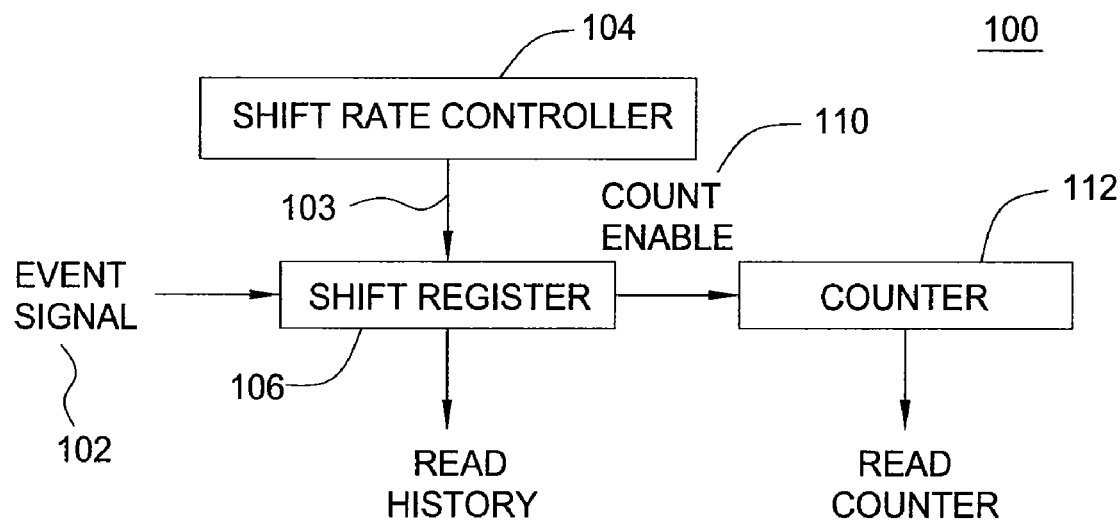
FIG. 1 is a block diagram of an apparatus for monitoring event occurrences in accordance with the present invention.

The present invention discloses a method and apparatus for monitoring event occurrences. In one embodiment, FIG. 1 illustrates an apparatus 100 for monitoring event occurrences, where the apparatus comprises a shift rate controller 104, a shift register 106, and a counter 112.

In operation, the shift register 106 receives an event signal 102. The event signal 102 may comprise one or more monitored events, such as misses in a cache, overflows in buffers, functional unit utilization, issuing particular operation types, taking a particular branch direction, and so on. In one embodiment, the event signal 102 comprises a string of zeros (0) and ones (1) in a binary format, where "0" indicates the absence of the monitored event and "1" indicates the presence of the monitored event or vice versa. However, it should be noted that other formats for the event signal can be used to represent the presence or absence of the monitored event(s). The shift rate controller 104 generates a shift rate signal 103 that controls when the stored information will be shifted within the register 106, thereby effectively controlling the granularity with which occurrences of events are monitored. In other words, the frequency of receiving information from the event signal 102 can be made different from the frequency of receiving the shift rate signal 103. Certainly, the frequency of receiving information from the event signal 102 can be the same as the frequency of receiving the shift rate signal 103 if appropriate for a particular application. Finally, the count enable signal 110 leaving the shift register 106 is received and used by the counter 112 to count the number of intervals in which the monitored events have occurred. Thus, by reading the counter 112 and the shift register 106, the present invention can track the number of occurrences within the counter 112, whereas the register 106 displays the most recent information or a pattern history as to which time intervals that the event(s) occurred.

Figure 2:
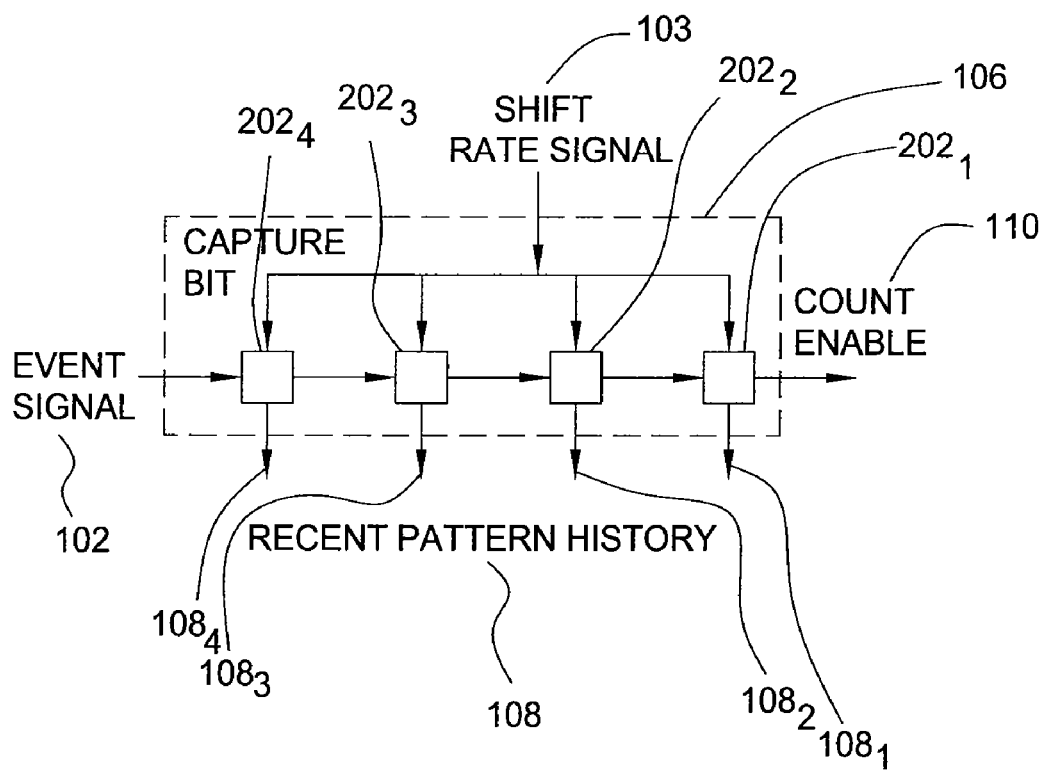
FIG. 2 is a block diagram of an embodiment of a shift register in accordance with the present invention.

FIG. 2 is a block diagram of an embodiment of a shift register 106 in accordance with the present invention. Specifically, FIG. 2 depicts the shift register 106 receiving the shift rate signal 103 and the event signal 102. For illustrative purposes, the shift register 106 contains four bits $202_1$, $202_2$, $202_3$, and $202_4$ (collectively bits 202). However, it is appreciated that the invention may be used in accordance with a shift register containing more or less bits. Namely, the number of bits used by the register 106 reflects the length of the pattern history that can be recorded and reviewed.

In one embodiment, the leftmost bit $202_4$ is a capture bit and is coupled to the event signal 102. Capture bit $202_4$ is coupled to the adjacent storage bit $202_3$ and storage bits $202_1$, $202_2$, and $202_3$ are controlled by the shift rate signal 103. Each of the bits 202 contains a respective lead $108_1$, $108_2$, $108_3$, and $108_4$, which when viewed collectively represent the recent pattern history 108. In operation, a "1" in the event signal can be captured by the capture bit $202_4$. However, since the shift rate signal 103 controls the shifting of bits in the register 106, the capture bit $202_4$, if full, cannot capture another event bit, until the shift rate signal 103 causes the information stored in capture bit $202_4$ to be shifted into bit $202_3$. Thus, additional event bits (e.g., 1s) are not captured if the capture bit $202_4$ is still full. A more detailed description is provided below with reference to FIG. 4.

Figure 4:
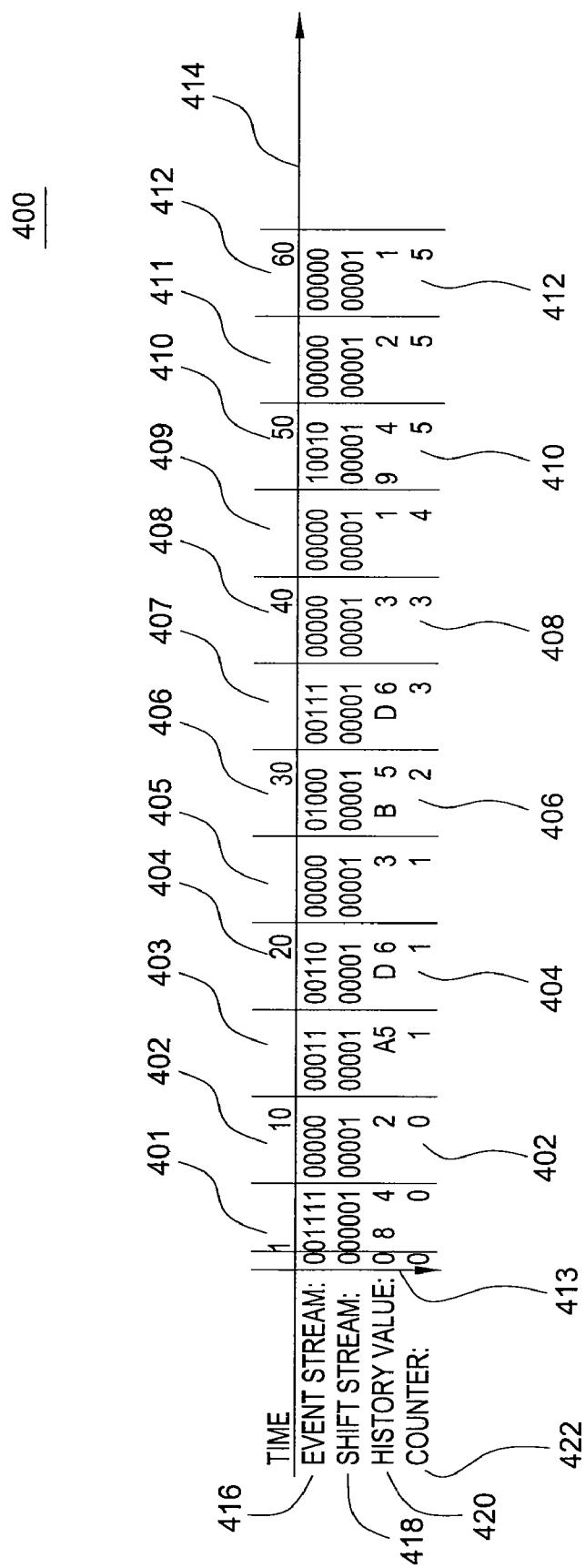
FIG. 4 is a graph in accordance with the embodiment of FIG. 1.

For a clear understanding of the operation of the shift register 106 and counter 112 depicted in FIG. 1, the reader is encouraged to view FIGS. 2 and 4 simultaneously. FIG. 4 is a graph in accordance with the embodiment of FIG. 1.

Specifically, FIG. 4 depicts a timeline of sixty cycles along the x-axis 414. Along the y-axis 413 are an event stream 416, a shift stream 418, a history value 420, and a counter 422. FIG. 4 also depicts the sixty cycles separated into twelve time intervals or periods 401, 402, 403, 404, 405, 406, 407, 408, 409, 410, 411, and 412. Thus, each of the periods 401-412 is a five cycle duration, which defines the granularity of the present example.

Referring back to FIG. 2, the shift register 106 has stored within bits 202 a value. Illustratively, the initial value is described as "0000". Periodically the shift rate controller 104 transmits a shift rate signal to shift bits $202_1$, $202_2$, and $202_3$ to the right, thereby effectively causing bit $202_4$ to shift its information to bit $202_3$ as well.

Illustratively, the shift rate signal 103 is described herein as transmitting a shift instruction every fifth clock cycle (as readily apparent from the shift stream 418). In the second cycle (located within period 401), an event signal is received and captured by bit $202_4$. As such a "1" is placed in the capture bit $202_4$. Each of the remaining bits $202_1$-$202_3$ has a "0" therein. Thus, the history value 420 at the second cycle contains a value of "1000" in binary or a hexadecimal value of "8". Although the event signal 416 indicates that monitored events occurred during the third through fifth cycles, these events do not affect the value stored in the capture bit $202_4$, i.e., these events are ignored. It is only necessary to capture one instance of the monitored event within each time interval as recorded in the capture bit $202_4$. At the end of the fifth cycle, the shift rate signal 103 causes bits $202_1$-$202_3$ to shift towards the right. The value formerly stored in the capture bit $202_4$ is also shifted to bit $202_3$. The capture bit $202_4$ thereafter contains a "0". Since bit $202_1$ contained a "0", the counter 112 is unchanged and will continue to reflect a count of zero (0). As a result of the shift signal, the register now indicates a history value of "0100" in binary or a hexadecimal value of "4".

During the period 402, no monitored event occurred. However, at the end of the tenth cycle a shift signal 103 is received and the register is shifted once again. As a result of the shift signal, the register now indicates a history value of "0010" in binary or a hexadecimal value of "2".

During the period 403, a monitored event occurred during the fourteenth cycle and is captured by bit $202_4$. As such, the value stored in the register now reflects the binary value "1010" or a hexadecimal value of "A". Although a monitored event occurred during the fifteenth cycle, the capture bit already has a "1" due to the previous event signal. As such, the event signal of the fifteenth cycle does not affect the capture bit $202_4$. At the end of the fifteenth cycle, a shift signal is received and bits $202_1$-$202_3$ are shifted towards the right. The capture bit $202_4$ moves to the bit $202_3$. Thus the history value 420 now reflects a binary value of "0101" or a hexadecimal value of "5".

During period 404, a monitored event occurred during the eighteenth cycle. As a result, the capture bit $202_4$ contains a "1" and the history value reflects a binary value of "1101" or a hexadecimal value of "D." As described above, subsequent occurrences of monitored events during the same period do not affect the value stored in the capture bit $202_4$. At the end of the twentieth cycle a shift signal is received. The history value now reflects a binary value of "0110" or a hexadecimal value of "6". Additionally, since bit $202_1$ contained a "1" that was shifted out of the register at the end of the twentieth cycle, it causes the value "1" to be transmitted to the counter 112 as a count enable signal 110. Thus, the counter 112 is incremented to a value of 1.

During period 405, no monitored event occurred. That is, no event being monitored was detected. At the end of the twenty-fifth cycle, a shift signal is received and bits $202_1$-

$202_3$ are shifted towards the right, while the capture bit $202_4$ moves to the bit $202_3$. The history value now reflects a binary value of "0011" or a hexadecimal value of "3".

During period 406, a monitored event occurred during the twenty-seventh cycle. As a result, the capture bit $202_4$ contains a "1" and the history value now reflects a binary value of "1011" or a hexadecimal value "B". A shift signal is received at the end of the 30th cycle resulting in a binary history value of "0101" or a hexadecimal value of "5". Additionally, since bit $202_1$ contained a "1" that was shifted out of the register at the end of the 30th cycle, it causes the value "1" to be transmitted to the counter 112 as a count enable signal 110. Thus, the counter 112 is incremented to a value of 2.

During period 407, a monitored event occurred during the thirty-third cycle. As a result, the capture bit $202_4$ contains a "1" and the history value now reflects a binary value of "1101" or a hexadecimal value "D". The shift signal is received at the end of the thirty-fifth cycle and causes the history value 420 to reflect a binary value of "0110" or a hexadecimal value of "6". Additionally, since bit $202_1$ contained a "1" that was shifted out of the register at the end of the 35th cycle, it causes the value "1" to be transmitted to the counter 112 as a count enable signal 110. Thus, the counter 112 is incremented to a value of 3.

During period 408, no monitored event occurred. That is, no event being monitored was detected. However, at the end of the fortieth clock cycle a shift signal is received and bits $202_1$-$202_3$ are shifted towards the right, while the capture bit $202_4$ moves to the bit $202_3$. The history value now reflects the binary value "0011" or a hexadecimal value "3" and the counter 112 remains at 3.

During period 409, no monitored event was detected. However, at the end of the forty-fifth clock cycle, a shift signal is received and bits $202_1$-$202_3$ are shifted towards the right, while the capture bit $202_4$ moves to the bit $202_3$. The history value now reflects a binary value of "0001" or a hexadecimal value of "1" and the counter 112 is incremented by 1 to a value of 4.

During the period 410, a monitored event occurred during the forty-sixth cycle. As such, the history value 420 now reflects a binary value of "1001" or a hexadecimal value of "9". At the end of the fiftieth cycle, a shift signal is received and bits $202_1$-$202_3$ are shifted towards the right, while the capture bit $202_4$ moves to the bit $202_3$. The history value now reflects the binary value "0100" or a hexadecimal value of "4" and the counter 112 is incremented by 1 to a value of 5.

During period 411, no monitored event 102 occurred (i.e., no event being monitored was detected). At the end of the fifty-fifth clock cycle a shift signal is received and bits $202_1$-$202_3$ are shifted towards the right, while the capture bit $202_4$ moves to the bit $202_3$. The history value now reflects a binary value of "0010" or a hexadecimal value of "2" and the counter 112 remains at a value of 5.

During period 412, no monitored event occurred (i.e., no event being monitored was detected). At the end of the sixtieth clock cycle, a shift signal is received and bits $202_1$-$202_3$ are shifted towards the right, while the capture bit $202_4$ moves to the bit $202_3$. The history value now reflects a binary value of "0001" or a hexadecimal value of "1" and the counter 112 remains at a value of 5.

Upon viewing the history value of the register for any given period 401-412, one can determine which recent time interval (e.g., within the last four time intervals in this illustrative example) that one or more monitored events may have occurred. For example, observing the history value at the beginning of period 412, it is apparent that at least one monitored event occurred three periods ago (i.e., at period 410).

In addition, reading counter 112 at the same period 412 will reveal that a total of five (5) monitored events have occurred. The sixth occurrence has been captured within the register, but has yet to be counted by the counter 112. Clearly, a total of 14 monitored events occurred during the 60 clock cycles. However, the present invention now provides an efficient and inexpensive apparatus for monitoring occurrences of events where it is capable of providing an occurrence history of the monitored events with a reasonable granularity, e.g., a reduced granularity.

Figure 3:
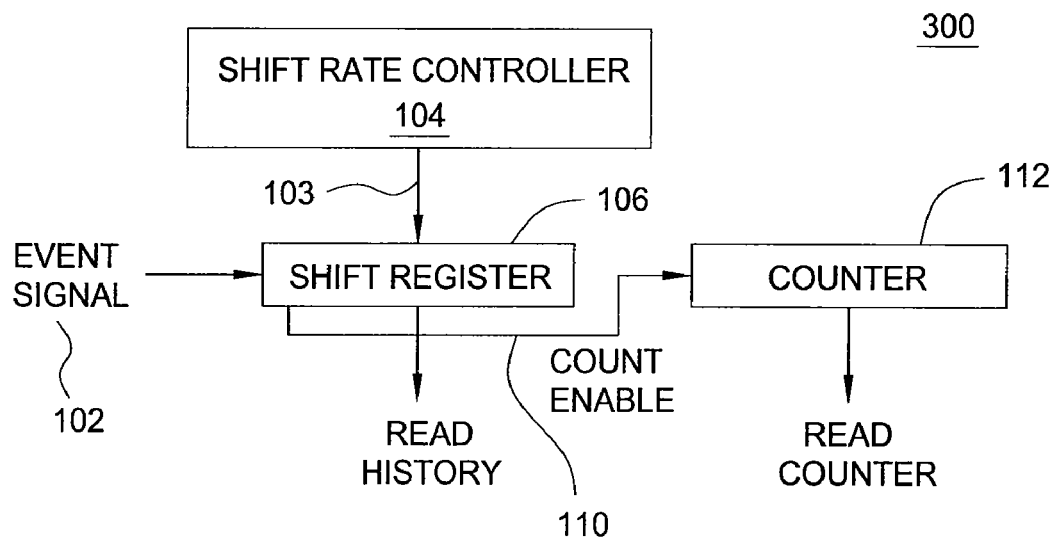
FIG. 3 is a block diagram of another embodiment of the apparatus for monitoring event occurrences in accordance with the present invention.

FIG. 3 is a block diagram of another embodiment of the apparatus 300 for monitoring event occurrences in accordance with the present invention. Specifically, FIG. 3 depicts shift register 106 that receives a shift rate signal 103 from a shift rate controller 104 and an event signal 102. Unlike the system of FIG. 1, the shift register 106 of FIG. 3 transmits a count enable signal 110 to the counter 112 from a different bit location. Namely, the count enable signal 110 is sent to the counter when the capture bit $202_4$ captures the bit of information indicative of the occurrence of the monitored event. Thus, information indicative of the occurrences of the monitored event can be sent to the counter 112 prior to the information passing through all of the bits of the register. Using the example of the FIG. 4, the counter would reflect a value of 6 instead of 5 at the end of period 412.

Figure 6:
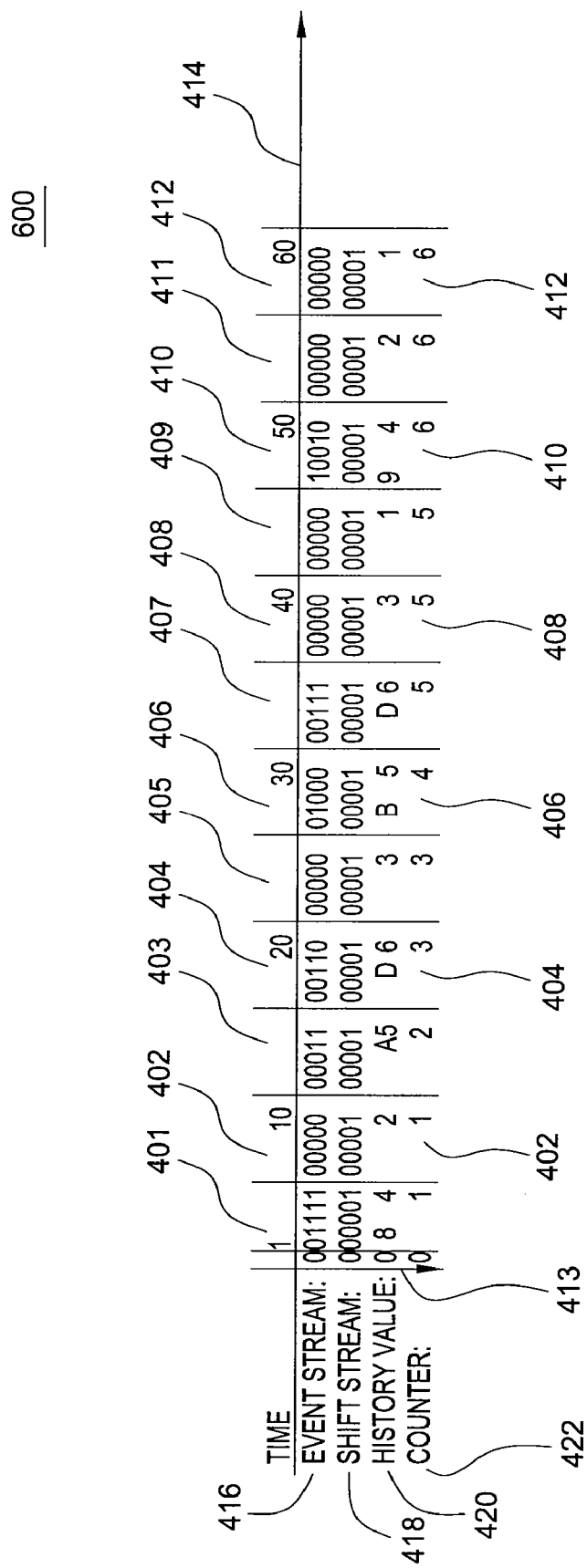
FIG. 6 is a graph in accordance with the embodiment of FIG. 3.

To further illustrate the embodiment of FIG. 3, a timing diagram is again provided in FIG. 6. It should be noted that the values for event stream 416, shift stream 418 and history value 420 are identical to those shown in FIG. 4. However, the difference is in the timing with which the counter is informed about the occurrence of the monitored event. Namely, the counter value 422 is informed immediately within each time period that a monitored event has occurred, e.g., when a bit is captured by the capture bit $202_4$. Thus, the counter value stream 422 is different between FIGS. 4 and 6. The description for the timing diagram for FIG. 6 is identical to FIG. 4 with the exception as to when the count enable signal 110 is forwarded to the counter so that the count can be incremented.

Figure 5:
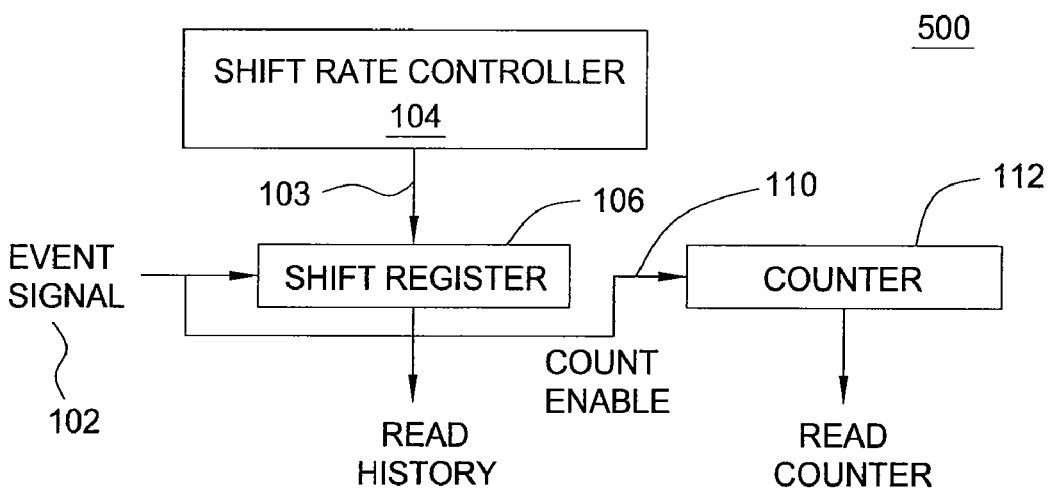
FIG. 5 is a block diagram of yet another embodiment of the apparatus for monitoring event occurrences in accordance with the present invention.

FIG. 5 illustrates yet another apparatus 500 for monitoring event occurrences of the present invention. Specifically, FIG. 5 depicts an embodiment where the event signal 102 is simultaneously transmitted to the counter 112 (as a count enable signal 110). The capture bit $202_4$ is still operated in a manner as discussed above to provide a reduced granularity of the recent history pattern. However, counter 112 is now receiving the information directly from the event signal that is not filtered by the register 106. In other words, all the occurrences of the monitored events will be counted. Thus, using the example as illustrated in FIG. 4, the counter 112 will now record a value of 14 at the end of period 412.

Figure 7:
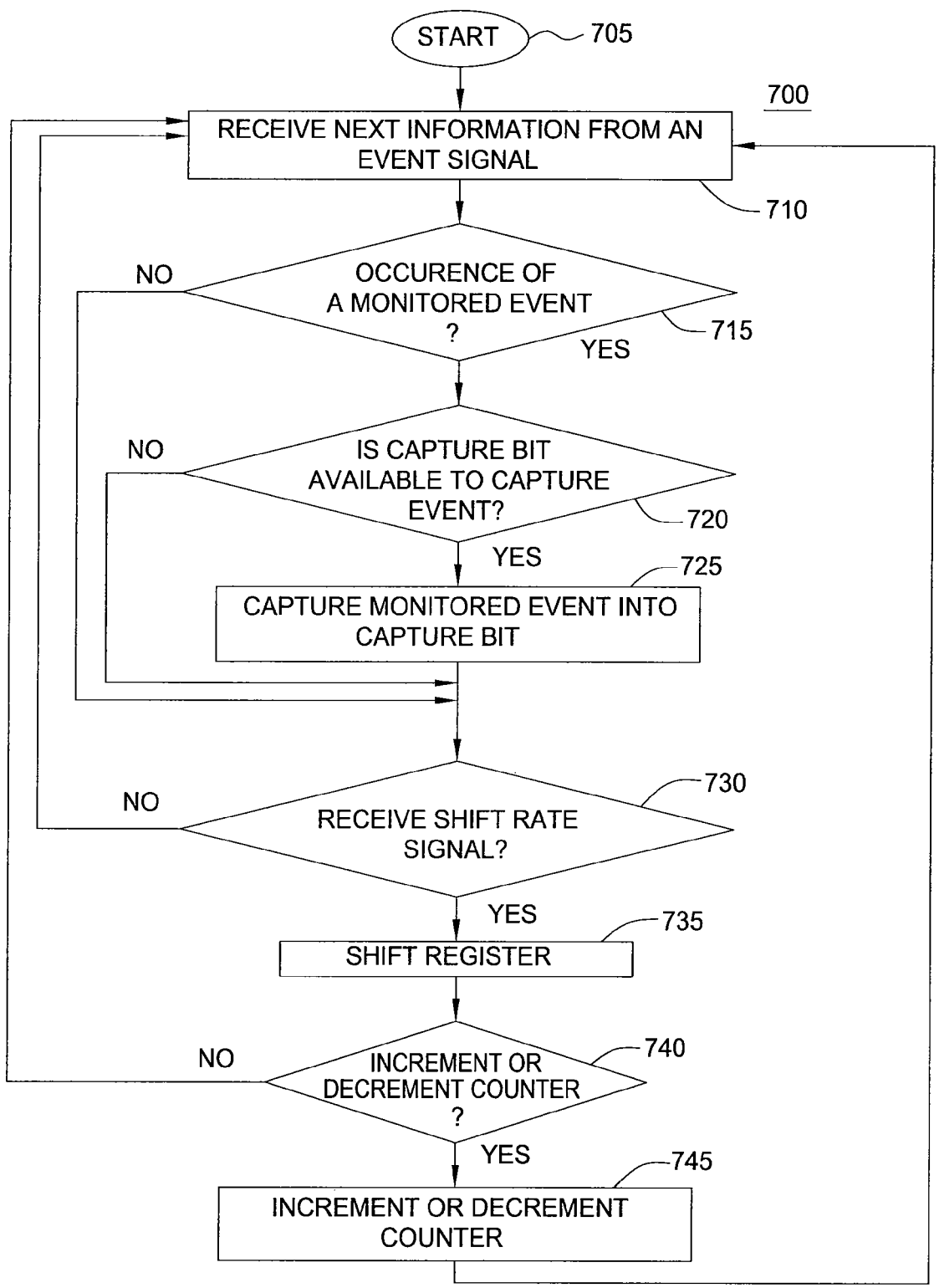
FIG. 7 is a monitoring method in accordance with the present invention.

FIG. 7 is a monitoring method 700 in accordance with the present invention. The method 700 begins at step 705 and proceeds to step 710.

In step 710, method 700 receives the next information (e.g., the next bit) from an event signal. If method 700 just started, then the method receives a first bit instead of a next bit of information from the event signal.

In step 715, method 700 queries whether the received information represents an occurrence of a monitored event. If the query is negatively answered, then method 700 returns to step 710, where the next information from the event signal is received. If the query is positively answered, then method 700 proceeds to step 720. Alternatively, it is possible to immediately proceed to step 745 via the dashed line to increment or decrement the counter. This alternate path illustrates the embodiment as illustrated in FIG. 5.

In step 720, method 700 queries whether the capture bit is available to capture the information representative of the occurrence of the monitored event. If the query is negatively answered, then method 700 returns to step 710, where the next information from the event signal is received. If the capture bit is full, then it will not be available to capture any additional data at this point. If the query is positively answered, then method 700 proceeds to step 725.

In step 725, the information representative of the occurrence of the monitored event is captured in the capture bit. Alternatively, it is possible to immediately proceed to step 745 via the dashed line to increment or decrement the counter. This alternate path illustrates the embodiment as illustrated in FIG. 3.

In step 730, method 700 queries whether a shift signal is received. If the query is negatively answered, then method 700 returns to step 710, where the next information from the event signal is received. Namely, the previously defined time interval has yet to elapse. If the query is positively answered, then method 700 proceeds to step 735, where the register is shifted.

In step 740, method 700 queries whether the counter should be incremented or decremented. Namely, method 700 is evaluating whether the bit shifted out of the register indicates the occurrence of the monitored event. If the query is negatively answered, then method 700 returns to step 710, where the next information from the event signal is received. If the query is positively answered, then method 700 proceeds to step 745, where the counter is incremented or decremented. This manner of controlling the counter reflects the embodiment of FIG. 1.

In step 750, method 700 queries whether there is additional information in the event signal. If the query is positively answered, then method 700 returns to step 710, where the next information from the event signal is received. If the query is negatively answered, then method 700 ends in step 755.

Figure 8:
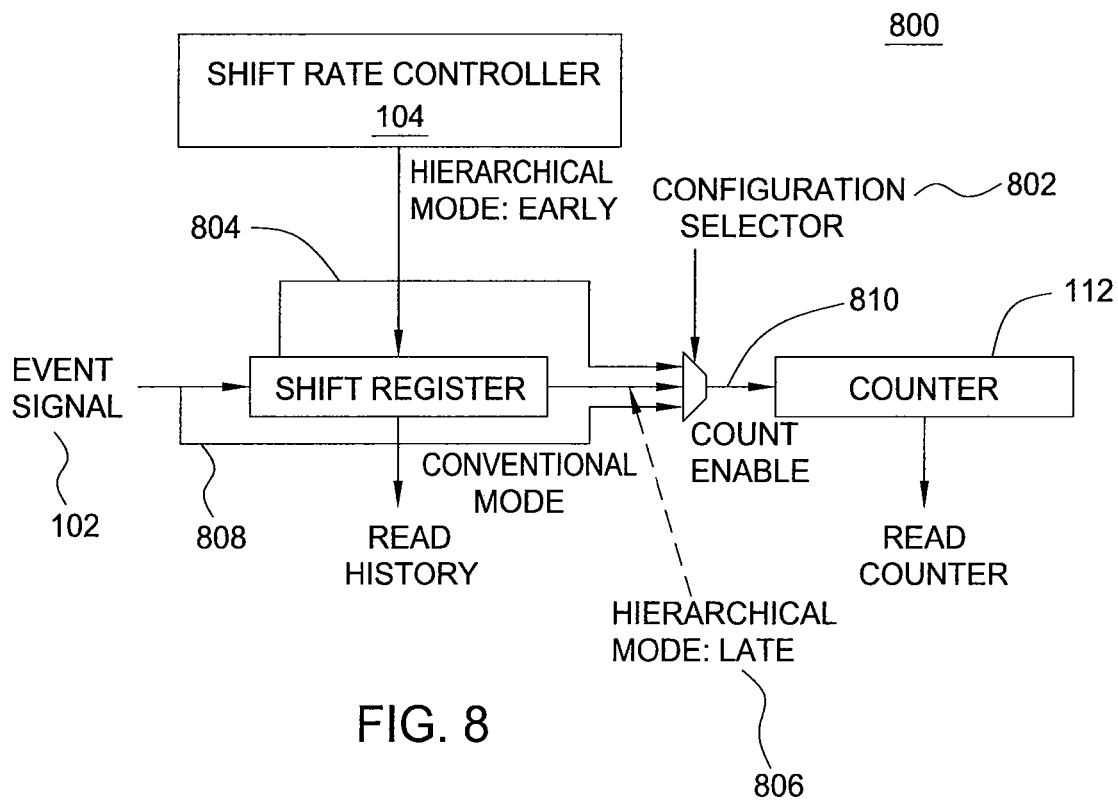
FIG. 8 is another embodiment of an apparatus for monitoring event occurrences in accordance with the present invention.

FIG. 8 depicts another apparatus 800 for monitoring event occurrences of the present invention. Specifically, FIG. 8 depicts apparatus 800 that contains all three embodiments depicted in FIGS. 1, 3 and 5. Similar elements depicted in FIG. 8 have been previously described with respect to FIGS. 1, 3, and 5. As such and for brevity a recitation of those elements will not be repeated. However, it is noted that lead lines 804 (hierarchical mode: early), 806 (hierarchical mode: late) and 808 (conventional mode) depict the count enable signals previously described in FIGS. 1, 3 and 5, respectively. In addition, FIG. 8 also depicts a configuration selector 802 which allows any one of three modes to be selectively applied.

Figure 9:
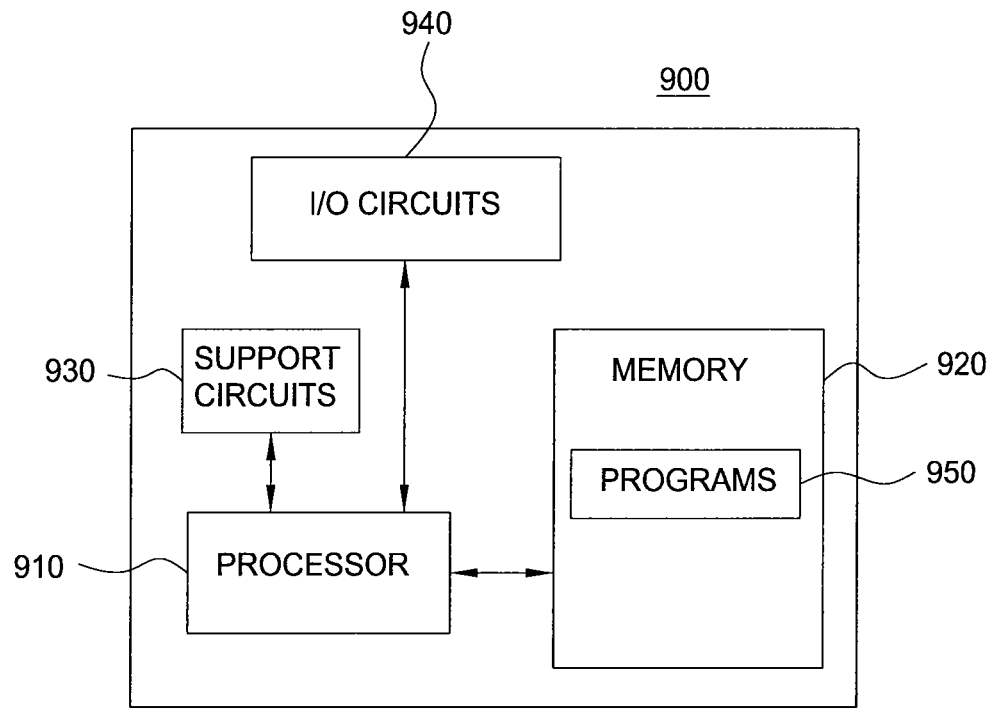
FIG. 9 is a block diagram of a system in accordance with the present invention.

FIG. 9 depicts a high level block diagram of the present invention implemented using a general purpose computing device 900. In one embodiment, general purpose computing device 900 comprises a processor 910, a memory 920 for storing programs 950, data and the like, support circuits 930, and Input/Output (I/O) circuits 940. The processor 910 operates with conventional support circuitry 930 such as power supplies, clock circuits, and the like. Additionally, processor 910 also operates with a plurality of I/O circuits or devices 940 such as a keyboard, a mouse, a monitor, a storage device such as a disk drive and/or optical drive and the like. In one embodiment, the present apparatus and method for monitoring event occurrences can be adapted as a software application that is retrieved from a storage device 940 that is loaded into the memory and is then executed by the processor 910.

As such, it is contemplated that some and/or all of the steps of the above methods and data structure as discussed above can be stored on a computer-readable medium.

Alternatively, the present apparatus for monitoring event occurrences can be implemented, in part or in whole, in hardware, for example, as an application specific integrated circuit (ASIC). As such, the process steps described herein are intended to be broadly interpreted as being equivalently performed by software, hardware, or a combination thereof.

In the above description, the invention is described with respect to a four bit shift register. However, this illustrative depiction is not intended in any way to limit the scope of the invention. For example, the invention can be implemented with a shift register having less or more bits (e.g. three bits, five bits, six bits and so on). In addition, the shift register is described above as shifting towards the right and the counter is described as an incrementing counter, however, it is appreciated that the invention may be adapted to shift left and the counter may also be a decrementing counter to suit a particular implementation. For example, the counter can be used to monitor a specific number of occurrences of a monitored event, where a decrementing countering scheme is more appropriate.

Additionally, in one embodiment, it is possible to omit the counter in accordance with a particular application. Furthermore, it is also possible to employ more than one capture bit within the register in accordance with a particular application.

Figure 10:
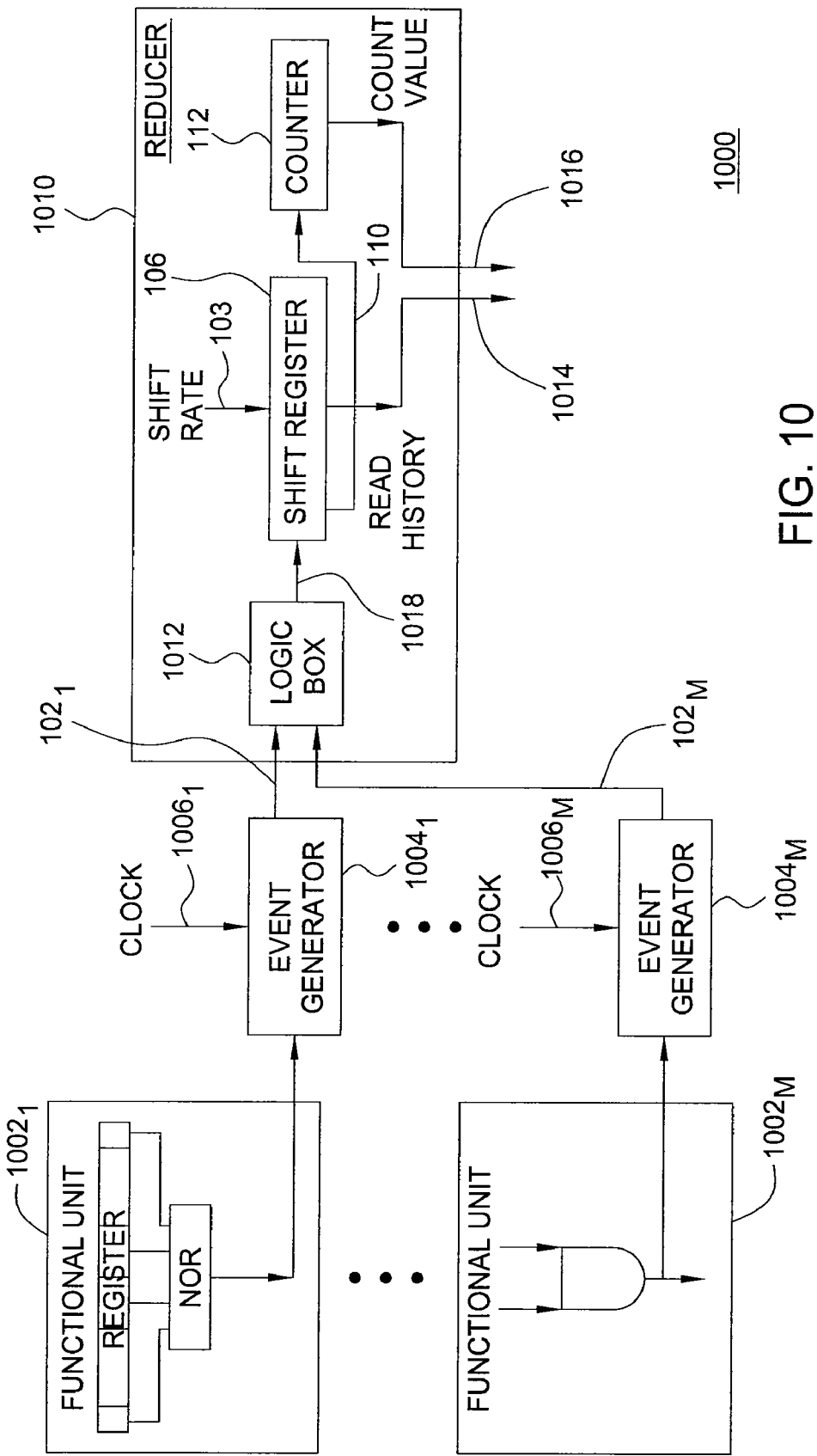
FIG. 10 depicts an embodiment of a multi-signal reducer for monitoring event occurrences of the present invention.

FIG. 10 depicts a multi-signal reducer 1010 for monitoring event occurrences of the present invention. The reducer 1010 receives an event stream and converts the stream, via a predetermined format, into a compact event signal output. Such event signal output may be a count of event occurrences, a pattern of the event occurrences, or some other compacted representation of the event stream.

In particular, FIG. 10 depicts a plurality of functional units $1002_1$ through $1002_m$ (collectively functional units 1002) each having an output respectively coupled to a plurality of event generators $1004_1$ through $1004_m$ (collectively event generators 1004). Each event generator 1004 has an output coupled to a logic device 1012 of the reducer 1010 of the present invention. The functional units 1002 generate events that may represent cache misses, number of instructions being retired, whether a queue is full, partially full, or empty, among any other predetermined threshold or processor event that is desired to be measured.

In the exemplary embodiment shown in FIG. 10, a first functional unit $1002_1$ illustratively depicts a multi-bit register having at least one bit coupled to a NOR gate. An output of the NOR gate is coupled to an input of the event generator $1004_1$. In this example, when all the bits in the register are in a low state "0", the NOR gate outputs a high state "1" to the clock generator 1004. A clock $1006_1$ may be provided to trigger the event signal $102_1$ being sent to the logic device 1012. Thus, the event signal $102_1$ may illustratively comprise a stream of 1s an 0s, depending on the clock signal $1006_1$.

Similarly, an "$m^{th}$" functional unit $1002_m$ illustratively depicts an AND gate, which has an output coupled to an input of the event generator $1004_m$. When all of the inputs to the AND gate are high (1s), the output to the event generator $1002_m$ is also in a high state. Otherwise, the output to the event generator $1002_m$ will be in a low state (0). A clock $1006_m$ may also be provided to trigger the event signal $102_1$ being sent to the logic device 1012. One skilled in the art will appreciate that the functional units 1002 may be any type of hardware/software device illustratively used by a processor, as discussed above with respect to FIGS. 1-9.

The reducer 1010 comprises the shift register 110, shift rate controller 104, and counter 112, which are illustratively configured as discussed above with respect to FIG. 3. The logic device (e.g., Boolean logic device) 1012 is coupled to the input of the shift register (e.g., capture bit $202_4$). The logic device 1012 is capable of receiving a plurality of event signal inputs $102_1$ through $102_m$ (collectively event signal 102) originating from the plurality of event generators $1004_1$ through $1004_m$.

The logic device 1012 may be any logic operator, such as an AND, NAND, OR, NOR, exclusive OR, and the like, or any combination thereof. The logic device 1012 performs the Boolean logic associated with the logic operator to provide a single output that is transferred to the shift register 106, as discussed above.

For example, assume the logic device 1012 comprises an AND operator having two inputs, as shown in FIG. 10. A high bit "1" will be imputed to the shift register in those instances where both event signals 102 are in a high state. An AND logic operator in the logic device 1012 may illustratively be utilized in an instance where a first stream (e.g., $102_1$) indicates whether the first of two floating point units in a processor are busy, while a second stream (e.g., $102_m$) indicates whether the second floating point unit is busy. The logical AND illustratively feeds a high bit "1" into the first bit of the shift register 106 in an instance where both functional units 1002 become busy simultaneously at any point during the shift interval. The signal 110 feeds this information into the counter 112, which records the number of intervals in which both units are busy simultaneously at least once.

An output signal 1016 from the counter 112 provides the count value or number of event occurrences. Further, an output 1014 from the shift register 106 provides a read history illustrating the latest bit pattern stored in the register. This pattern provides information on the exact interval in which both floating point units were busy for some part of the interval.

Accordingly, the logic device 1012 may serve as a multiplexer, combiner, adder, subtractor, and the like. Although the logic device 1012 is described as a single logic operator, one skilled in the art will recognize that various logic operator configurations may be utilized to combine multiple event signals 102 into a single cumulative output stream, prior to being sent to the shift register 106. In other words, various groupings of events may be first combined with a first set of logic operators, and then the outputs of those first set of logic operator groups may be subsequently combined by a second set of logic operator groups, and so forth, until a single cumulative output (i.e., cumulative event signal) 1018 is derived for transfer to the shift register 106. It is also noted that although the shift register 106 is illustratively shown as being coupled to the counter 112 by the first bit (e.g., bit $202_4$), the invention is also contemplated as being operable in a similar manner as shown and described above with respect to FIGS. 5 and 8.

The embodiments described above with respect to FIGS. 1-10 provide a method and apparatus for condensing information generated by an event generator 1004 using a hierarchical decay counter. The hierarchical counter converts a continuous stream of data into a more compact representation embodied in a shift register 106 and the counter 112. Such an apparatus that condenses the large volume of information coming from one or more event generators is hereinafter termed a "reducer" 1010. It is noted that the logic device 1012 is an optional component of the so called reducer 1010, as it is only utilized when combining multiple events into a cumulative event signal. As discussed below in further detail, one or more reducers 1010 may be implemented along with a dedicated bus and a "digest collector" to provide more efficient performance monitoring.

Performance monitoring systems are illustratively used by processors to observe a wide range of events, from instruction issue to branch and cache behavior. Several modes of operation are generally available, including sampling, where selected instructions are traced through the processor, and counting, in which a total number of events are counted either within a given time interval, between two points in program code, or between two trigger events. However, sending individual event information to a central monitoring unit may be prone to miscounts, particularly if the path is reliant on a bus used for other functionality. Accordingly, a processor bus and digests for performance monitoring are shown and discussed below with respect to FIGS. 11-17.

Figure 11:
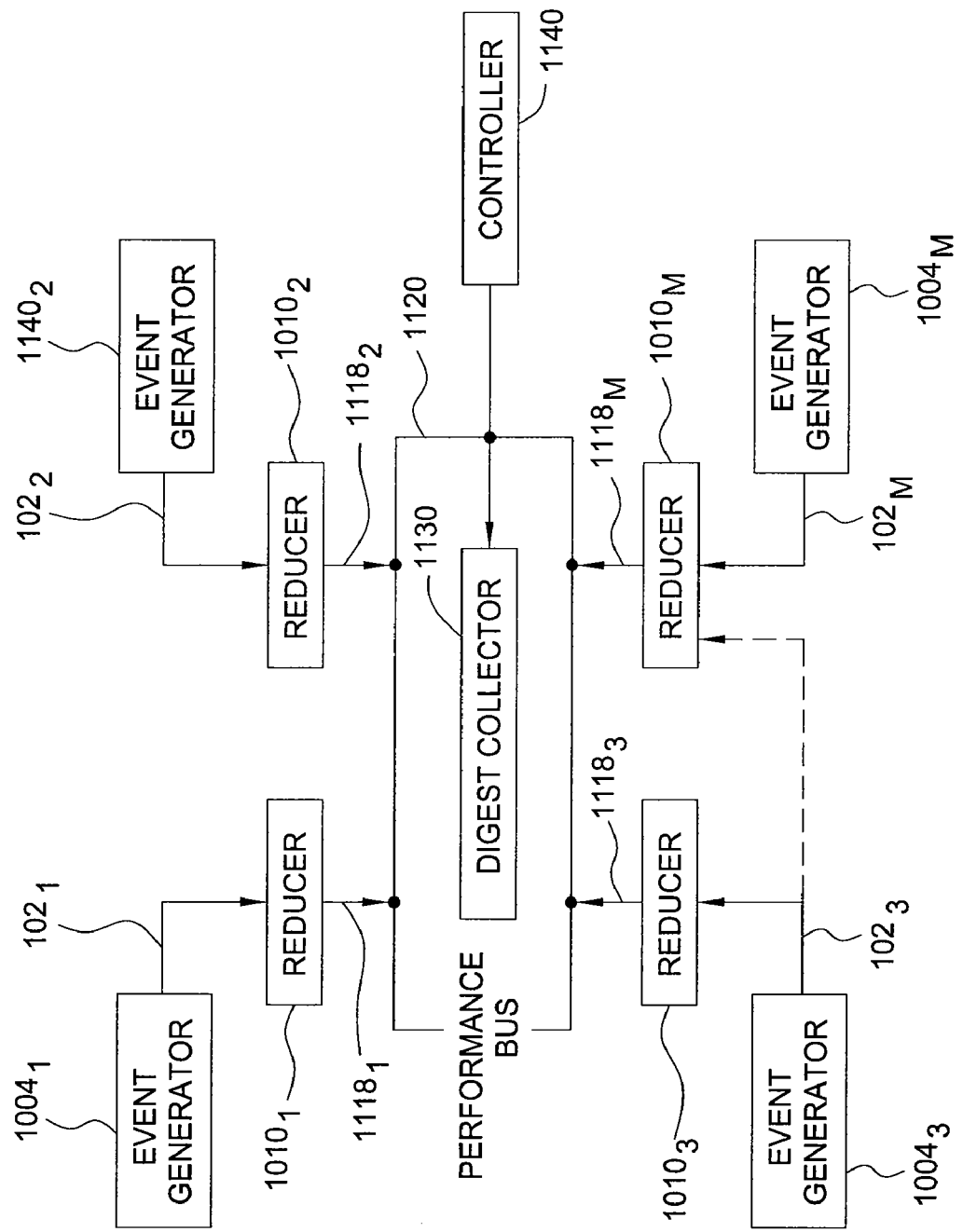
FIG. 11 depicts a block diagram of a digest collector of the present invention.

FIG. 11 depicts a block diagram of a data collection apparatus 1100 of the present invention. The data collection apparatus 1100 comprises a plurality of event generators $1004_1$ through $1004_m$ (collectively event generators 1004), a plurality of reducers $1010_1$ through $1010_m$ (collectively reducers 1010), a performance bus 1120, a digest collector 1130, and a controller 1140. Each event generator 1104 is coupled to the performance bus 1120 via a respective reducer 1004. Further, the digest collector 1120 and controller 1140 are also coupled to the performance bus 1106. Generally, the controller 1140 is utilized to provide feedback to the functional units 1002 to either reconfigure measuring parameters of the functional unit 1002 or the parameters of its respective reducer 1010. Further details of the functional aspects of the controller 1140 are discussed below with respect to FIGS. 14-17.

For illustrative purposes, it is noted that the reducers $1010_1$ through $1010_3$ respectively receive event signals $102_1$ through $102_3$ from event generators $1004_1$ through $1004_3$, as discussed above with respect to FIGS. 1-9. Furthermore, reducer $1010_m$ illustratively receives a first event signal $102_m$ from event generator $1004_m$, as well as a second event signal $102_3$ from the event generator $1004_3$, as discussed above with respect to FIG. 10. One skilled in the art will appreciate that any number of event generators 1004 may be coupled to the performance bus 1120 via a respective reducer 1010, and each of the reducers 1010 may be configured (i.e., coupled) to one or more event generators 1004 in any manner as discussed above.

The outputs of the exemplary plurality of reducers $1010_1$ through $1010_m$ are coupled to the performance bus 1120 respectively via lines $1118_1$ through $1118_m$ (collectively reducer output lines 1118). It is noted that the reducer output lines 1118 could, for example, represent the hierarchal count value outputs 1016 and/or read history patterns 1014 respectively generated from the counter 112 and shift register 106, as shown in FIG. 10.

In one embodiment, the performance bus 1120 has a bus width capable of receiving a single output signal from an output line 1118 of a reducer 1010 at a time. In this instance, an arbitrator (not shown) determines which reducer 1010 sends its output to the digest collector 1130 at a given time via an arbitration technique conventionally known in the art. In a second embodiment, the performance bus 1120 may have a width capable of accepting two or more reducer output signals via lines 1118 at a time. For example, if each reducer provides a 4 bit output over line 1118, and the bus width is 16 bits, then all four exemplary reducers 1010 may contemporaneously provide an output signal, via their respective output lines 1118 to the performance bus 1120. If the performance bus 1120 is only 8 bits wide, then two 4-bit event occurrences may be sent to the bus 1120 at a time, however, an arbitrator would still be required in instances where three or more event occurrences were being contemporaneously sent to the performance bus 1120.

The event signal 1118 from one or more reducers 1010 (depending on the bus width) is sent to the digest collector

1130. The digest collector 1130 monitors the bus 1120, and at some periodic interval saves the output value from line 1118 in a latch or temporary register. Accordingly, in this first embodiment, values sent over the bus 1120 are latched into a collector latch, and then sent to a special purpose register file from where the values can be read by a program or sent to the controller 1140.

Figure 12:
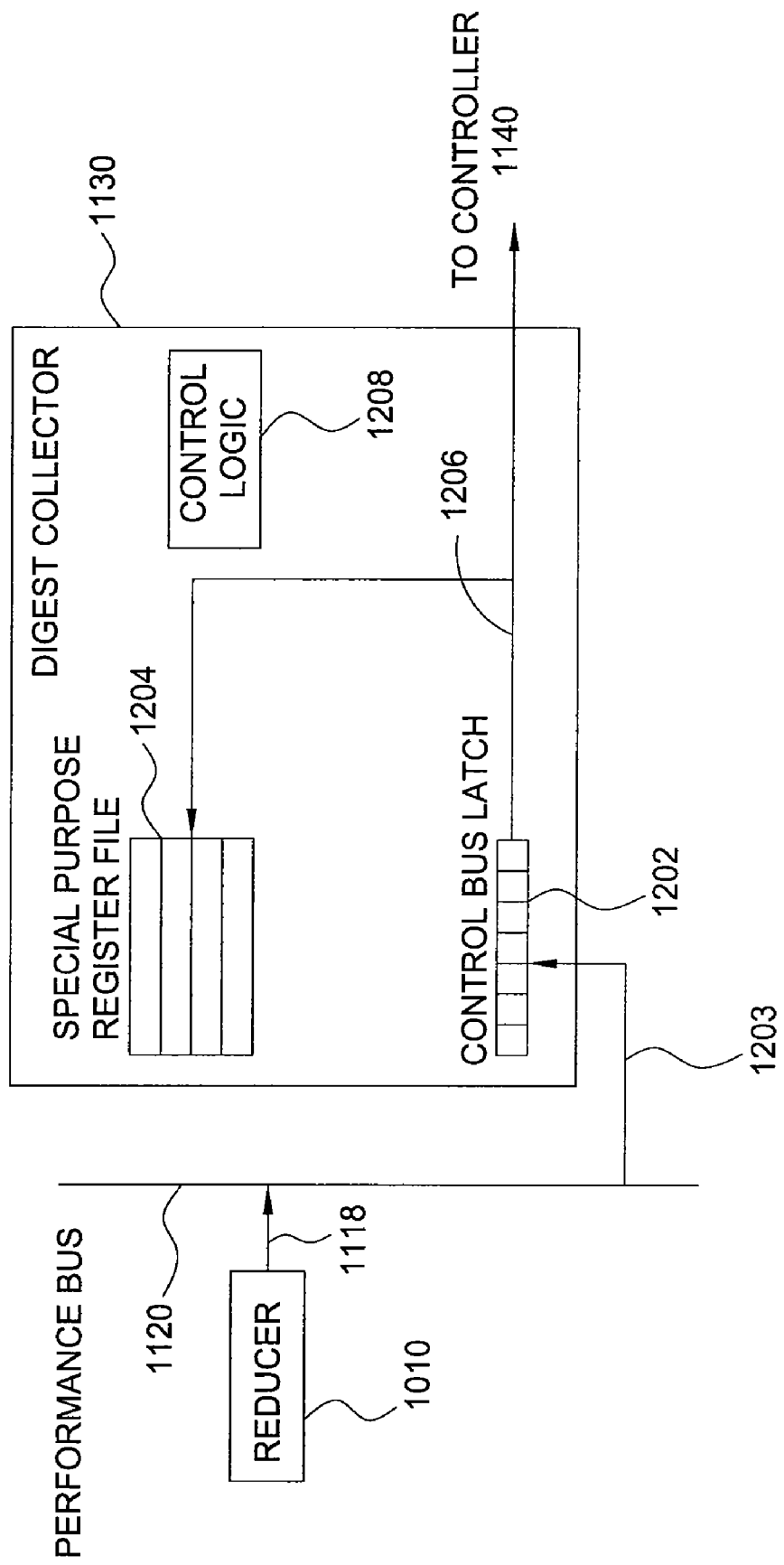
FIG. 12 depicts a block diagram of a first embodiment of the digest collector of FIG. 11.

FIG. 12 depicts a block diagram of a first embodiment of the digest collector of FIG. 11. In particular, FIG. 12 shows the output 1118 of a reducer 1010 coupled to the digest collector 1130 via the performance bus 1120. The digest collector 1130 comprises a collector bus latch (i.e., buffer), a special purpose register (SPR) file 1204, and control logic 1208. The output value from the reducer 1010 is sent to an input 1203 of the collector bus latch 1202. At some time interval, the control logic 1208 sends the output value from the reducer 1010 to the SPR file 1204 via latch output path 1206.

Specifically, each output value from the reducer 1010 is sent along with a tag. The tag is used to provide special instructions to the control logic 1208 of the digest collector 1130. The tag may comprise one or more bits that are appended or prepended to the output value from the reducer 1010. The control logic 1208 examines each tag and determines whether the output value should be stored. If the tag indicates that the output value from the reducer 1010 is to be stored (e.g., the bits are all set high), the control logic 1208 instructs the collector bus latch 1202 to send the output value (and not the tag) to the SPR file 1204 for storage. Otherwise, the output value is not stored in the SPR file 1204, and only remains in the collector bus latch 1202.

Accordingly, arithmetic or logical operations are performed on the value latched from the performance bus 1120, prior to being sent to the controller 1140 or registered in the special purpose registers 1204. The digest controller 1130 may record data for all instructions triggering a particular event, a random set of instructions, or a limited number of instructions, such as those marked for sampling or those sharing a particular opcode. The digest may provide a count of events, or represent the result of filtering or condensing the data (e.g., via the reducers 1010). Thus, the collection of events in the digest collector 1130 helps reduce the amount of information transmitted along the bus 1120, while the dedicated performance bus 1120 helps ensure that the digest 1130 will not contend with traffic not related to performance monitoring, as occurs in systems where performance data is transmitted across a bus shared for multiple purposes. In addition, the digest collector 1130 may also take various forms, such as a software interface, or an on-chip buffer, among other conventional performance monitoring units.

Figure 13:
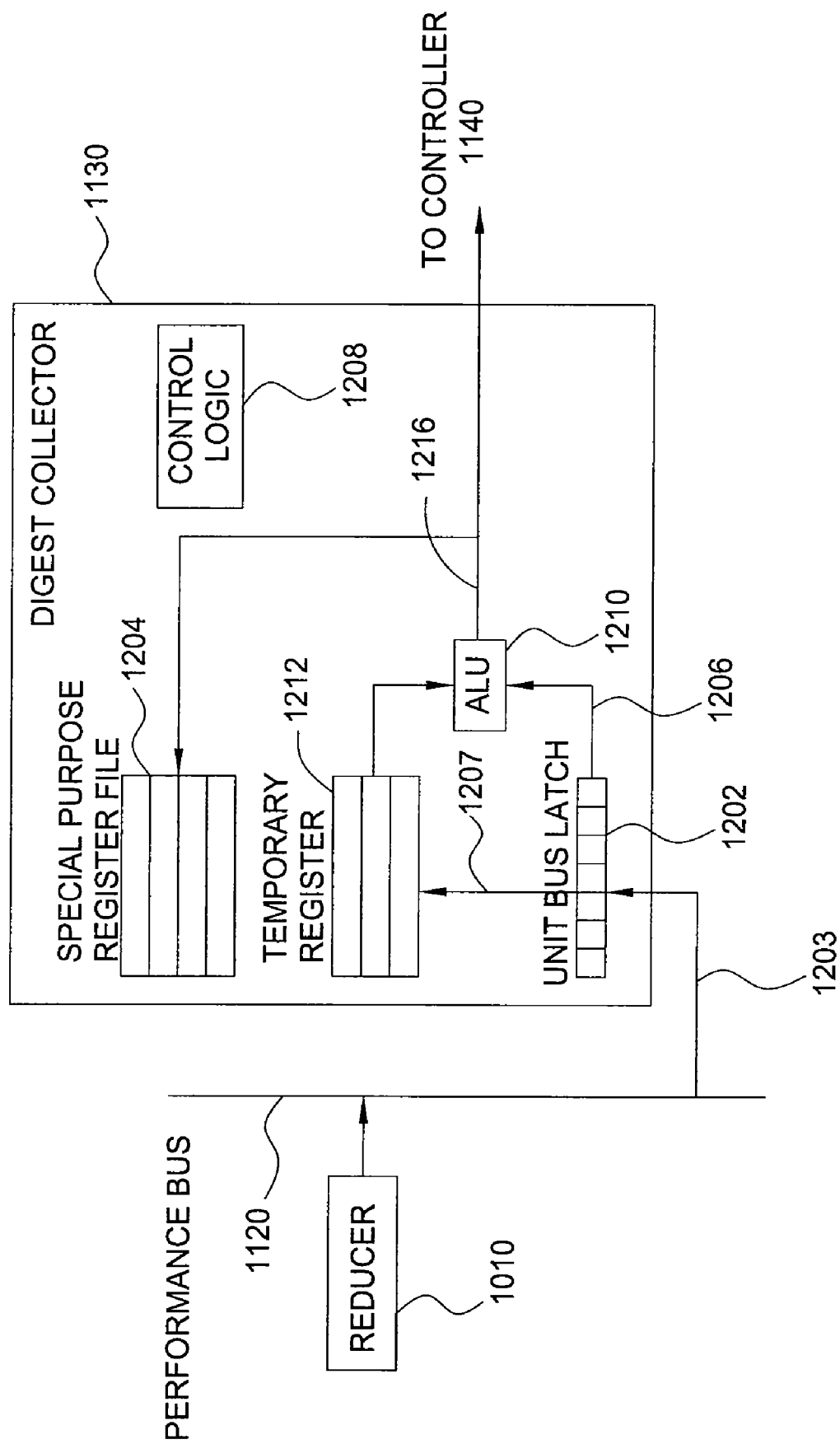
FIG. 13 depicts a block diagram of a second embodiment of the digest collector of FIG. 11.

FIG. 13 depicts a block diagram of a second embodiment of the digest collector 1130 of FIG. 11. This second embodiment is the same as the first embodiment of FIG. 12, except that an arithmetic-logic unit (ALU) 1210 and a temporary register file 1212 is also implemented in the digest collector 1130.

Specifically, a first output 1206 of the bus latch 1202 is coupled to an input of the ALU 1210. Furthermore, a second output 1207 of the bus latch 1202 is coupled to an input of the temporary register file 1214. The output of the ALU 1210 is coupled to the special purpose register (SPR) file 1204.

The ALU 1210 may be used to perform logic/arithmetic computations associated with two or more event occurrences. As discussed above with respect to FIG. 11, a plurality of reducers 1010 are coupled to the bus 1120, where each reducer 1010 is associated with an event occurrence. The ALU 1210 may perform some logic computations associated with two or more event occurrences to provide a single result (output), which is subsequently stored in the special purpose register file 1204.

In particular, the control logic 1208 determines which of the incoming event occurrences stored in the latch 1202 are to be selected for logic/arithmetic operation by the ALU 1210. Those selected event occurrences are temporarily stored in the temporary register file (input operand) 1212 via the second output path 1207. The temporarily stored event occurrences are sent to the ALU 1210 via path 1214, where the ALU 1210 carries out arithmetic and logic operations on the operands to generate an accumulated result (e.g., a combined count based on counts coming from two different reducers 1010). The accumulated result is then stored in the SPR file 1204 via ALU output path 1216.

For example, referring to FIGS. 11 and 13 together, assume event occurrences from reducers $1010_1$ through $1010_3$ are sent to the digest collector 1130 via bus 1120. The bus latch 1202 sequentially stores their respective values in the order they are received. If the ALU 1210 is set to perform a logic operation on the event occurrences from reducers $1010_2$ and $1010_3$, then the control logic 1130 sends these two event occurrences as separate entries in the temporary register file 1212. The control logic 1208 then sends the values from the temporary register file 1212 to the ALU 1210, where the logic operation is carried out. The accumulated result is then sent to the SPR file 1204 from which its value may be read later by a program or by some other hardware that uses the information to control the functioning of the processor. It is noted that in this example, the event occurrence from the first reducer $1010_1$ is sent directly to the special purpose register file 1204, thereby circumventing logical operations by the ALU 1210.

It is noted that the SPR file 1204 serves as an architecturally visible register file. This means that the contents of any register in the SPR file 1204 may be read by a program and be manipulated just like a program would manipulate contents of a general purpose register. The contents of the SPR file 1204 may also be examined by other hardware that uses the information to reconfigure the processor or control hardware resources in the processor.

For example, when events indicate that only 2 of the 4-ways in a set-associative cache are currently being used by a program, this information is transferred through the counter mechanism to a register in the SPR file 1204. Control hardware may then examine the specific register of the SPR file that contains this value, and then send a command to the cache to reconfigure itself so that it behaves as a 2-way set-associative cache, rather than a 4-way. It is noted that there is no need to combine sequentially as illustratively described above. Rather, the values coming from different reducers $1010_1$ through $1010_3$ may be stored in non-contiguous registers in the SPR file 1204.

Figure 14:
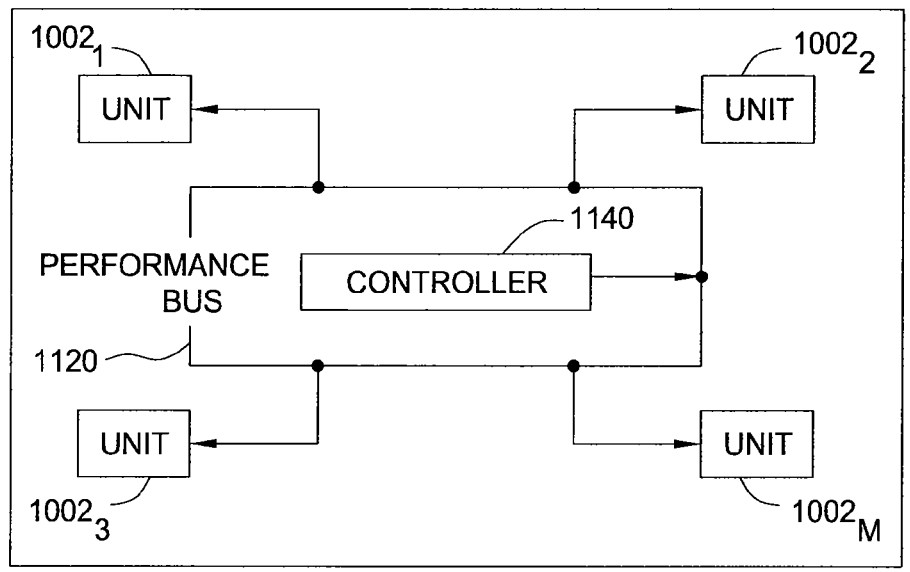
FIG. 14 depicts another embodiment of an apparatus for monitoring event occurrences in accordance with the present invention.

FIG. 14 depicts another embodiment of an apparatus 1400 for monitoring event occurrences in accordance with the present invention. That is, FIG. 14 depicts a high-level block diagram comprising a plurality of functional units 1002 coupled to the performance bus 1120, as discussed above with respect to FIGS. 10 and 11, and the controller 1140, which is also coupled to the performance bus 1120. Although not shown in FIG. 14, the digest controller 1130 is also coupled to the performance bus 1120, as discussed above with respect to FIGS. 11 and 12.

Figure 15:
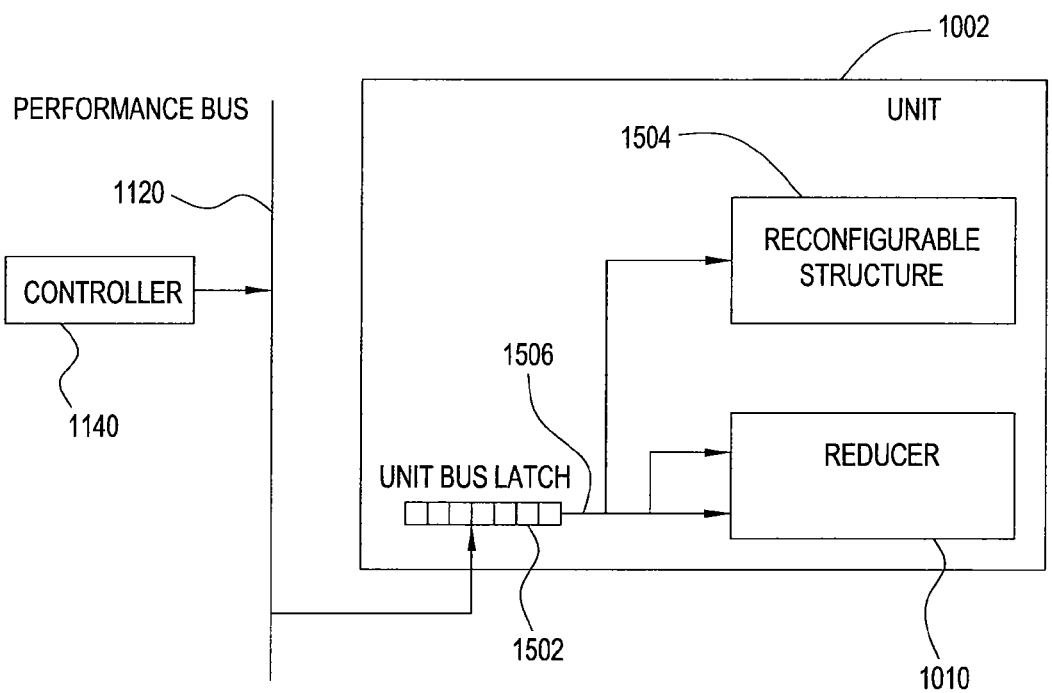
FIG. 15 depicts a detailed block diagram of the apparatus for monitoring event occurrences of FIG. 15.

FIG. 15 depicts a detailed block diagram of the apparatus 1400 for monitoring event occurrences of FIG. 14. In particular, the controller 1140 is coupled to each functional unit 1002 via the dedicated performance bus 1120. The controller 1140 is used to provide feedback to the functional units 1002, as discussed in detail below with respect to FIGS. 16 and 17.

Each functional unit 1002 comprises a unit bus latch 1502 having an output path 1506 coupled to a reconfigurable structure 1504 and a respective reducer 1010. The unit bus latch 1502 is a buffer that is capable of storing multiple bits or bytes of information (e.g., 8 bits). The "Reconfigurable Structure" 1504 represents the capability of a processor unit to adapt in response to information such as operating temperature or unit utilization. For example, the reconfigurable part in the cache example above is the associativity of the cache, while what is illustratively being measured is the utilization of the cache. The reducer 1010 represents one of the embodiments discussed above with respect to FIGS. 1 to 11.

Figure 16:
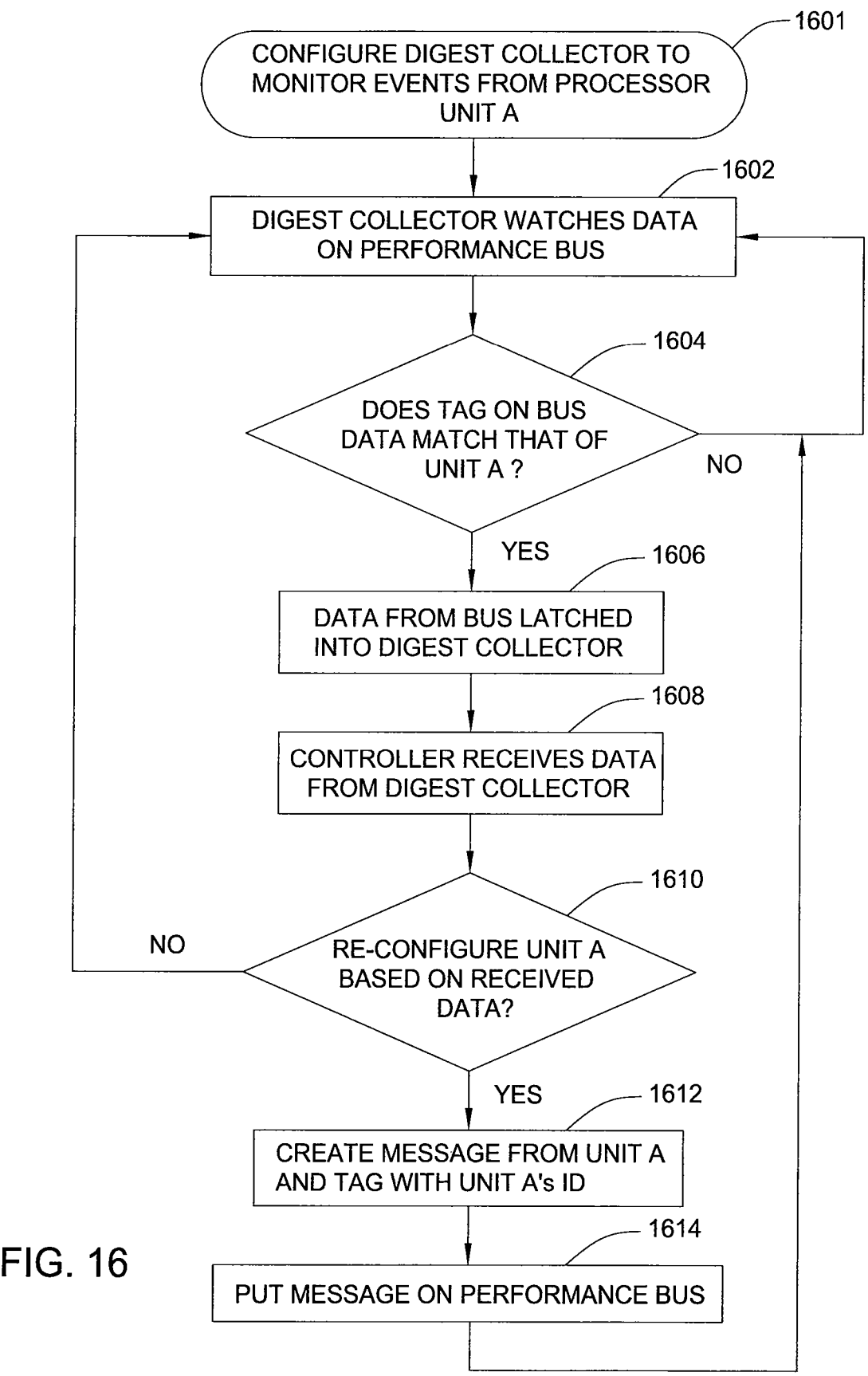
FIG. 16 depicts a flow diagram of a method of modifying processor units using a performance bus from a perspective of a controller.

FIG. 16 depicts a flow diagram of a first method 1600 of modifying functional processor units 1002 using a performance bus 1120 from the perspective of a controller 1140, and should be viewed in conjunction with FIGS. 11 and 15. The controller 1140 provides a means to make changes to the processor unit 1002, which as discussed above, provides a data stream representing spatial and/or temporal event occurrences. For example, the amount of storage used in a processor cache 1002 may be reconfigured for power or performance reasons. Another example would be to reconfigure one or more reducers to change the shift rate of the reducer(s). Yet another example may include instructions specifying the logic to be performed by the combinational circuitry of the reducer, as described with respect to FIG. 10. In other words, the controller 1140 may also be used to instruct one or more functional processor units 1002 to start or stop performing a counting function, as well as how the count is to be performed and condensed in the reducer.

Referring to FIG. 16, method 1600 starts at step 1601, where the digest collector 1130 is configured to monitor events from one or more functional processor units 1002. For purposes of clarity and understanding the invention, the method 1600 is discussed in terms of a single functional processor unit 1002, however the method described is also applicable to being contemporaneously implemented at multiple functional units 1002.

In one embodiment, the digest collector 1130 is configured by a program that uses special instructions to write into the configuration registers of the digest collector. Alternatively, the digest collector may be configured by the hardware during the process of initialization of the system. The method 1600 then proceeds to step 1602.

At step 1602, the digest collector 1130 monitors for data transmitted on the performance bus 1120. In particular, the digest collector 1130 examines a tag that is appended or prepended to the data output (e.g., count value) from the functional processor unit 1002. As discussed above, the data output is illustratively sent via a respective reducer 1010 via data path 1118.

At step 1604, the control logic 1208 of the digest collector 1130 makes a determination whether the tag indicates that the data output is associated with the data output from the functional unit 1002 that the digest collector 1130 was configured to monitor. If the determination is negatively answered, then the method 1600 proceeds to step 1602, where the digest collector 1130 continues to monitor for data output associated with a particular processor unit 1002.

However, if the determination of step 1604 is affirmatively answered (i.e., the tag does match), then the method 1600 proceeds to step 1606, where the data from the performance bus 1120 is latched into the digest collector 1130. Referring to FIG. 12, the output data is captured and stored in the bus latch 1202 via input 1203.

At step 1608, the controller 1140 receives the output data from the digest collector 1130. In particular, the data stored in the special purpose register (SPR) file 1204 is sent to the controller 1140. The controller 1140 then compares the received data to corresponding data stored in various tables (not shown) at the controller 1140. It is noted that the controller 1140 may receive the data from the digest collector 1130 in one of two ways: the controller 1140 may be instructed by software or hardware to access the data, or the controller 1140 may monitor (e.g., periodically) a particular SPR 1204 to react to certain threshold conditions.

At step 1610, it is determined whether the processor unit 1002 needs to be reconfigured based on the received data. For example, the controller 1140 may determine that a temperature threshold needs to be adjusted (i.e., raised or lowered). If at step 1610, the determination is negatively answered, then the method 1600 proceeds to step 1602, where the digest collector 1130 continues to monitor for data on the performance bus 1120. However, if at step 1610, the determination is affirmatively answered, then the method 1600 proceeds to step 1612.

At step 1612, the controller 1140 generates a message and associated tag for the particular functional processor unit 1002. The tag includes an identifier for the particular functional processor unit 1002. The message provides instructions to the functional processor unit 1002 to make a particular change (i.e., reconfiguration). For example, the controller 1140 may send a message to change an exemplary active buffer length from 32 entries to 8 entries in order to save power.

At step 1614, the controller 1140 transmits the message onto the performance bus 1120 for delivery to the processor unit 1002 corresponding to the identifying tag. The method 1600 then proceeds to step 1602, where the digest collector 1130 continues to monitor for data on the performance bus 1120. Once the functional processor unit 1002 receives the message, internal circuitry therein proceeds to make the changes according to the instructions from the controller 1140. In one embodiment, an optional confirmation message may be sent from the processor unit 1002 to the controller 1140 upon completion of such reconfiguration.

Figure 17:
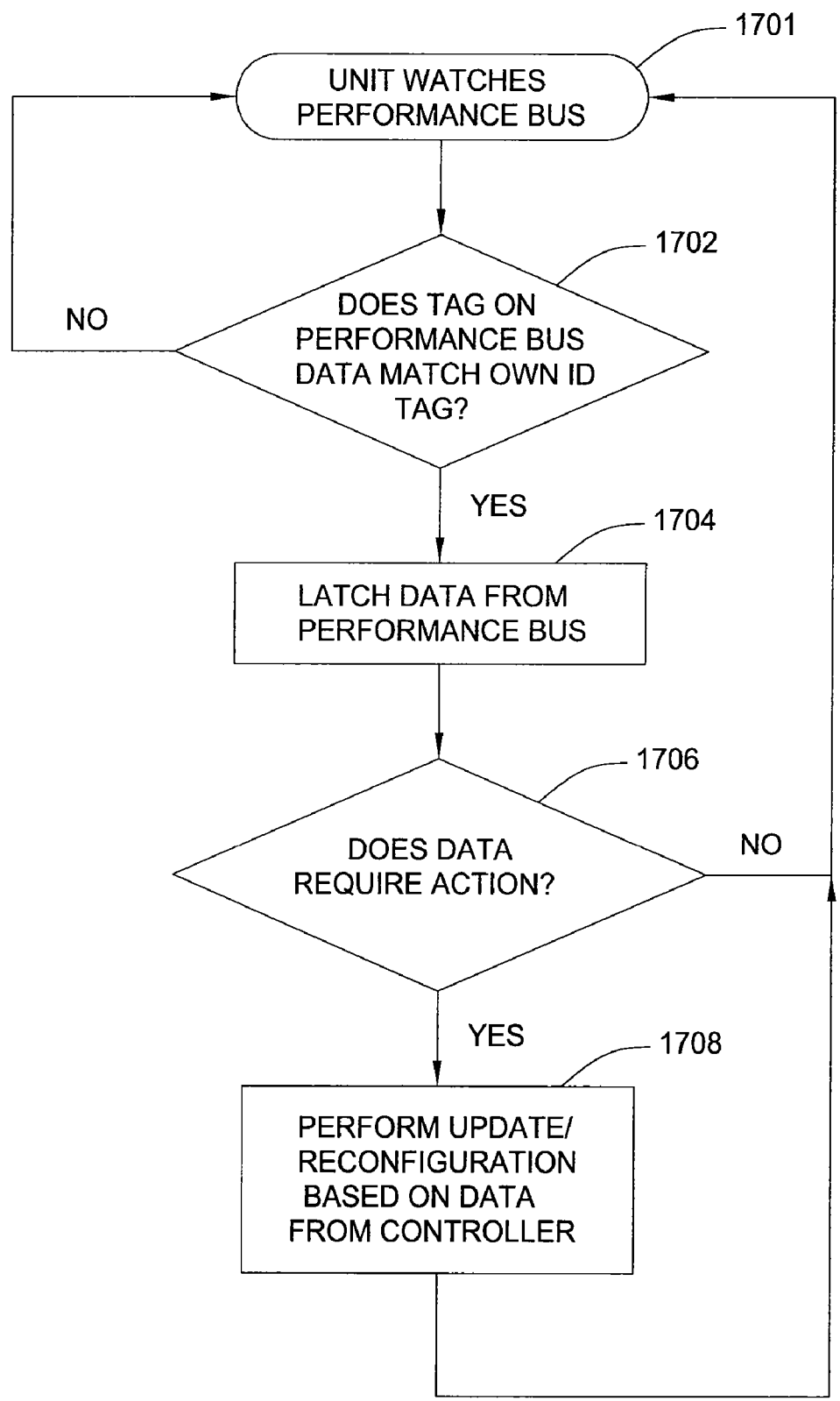
FIG. 17 depicts a flow diagram of a method of modifying processor units using a performance bus from a perspective of a processing unit.

FIG. 17 depicts a flow diagram of a second method 1700 of modifying functional processor units 1002 using the performance bus 1120 from the perspective of a processing unit 1002. Method 1700 starts at step 1701, where the processor unit 1002 monitors the performance bus 1120 for messages with their associated tags.

At step 1702, the processor unit 1002 determines whether an incoming message has a tag identifier matching its own identification tag. If at step 1702 the determination is negatively answered, then the method 1700 proceeds to step 1701, where the processor unit 1002 continues to monitor for incoming messages. Otherwise, if the tag identifier associated with the incoming message matches the identifier of the functional processor unit 1002, the method 1700 proceeds to step 1704.

At step 1704, the functional processor unit 1002 latches the message data from the performance bus 1120. Referring to FIG. 15, the incoming message is stored in the bus latch 1502. Processing circuitry (not shown) of the processor unit 1002 then examines the stored data in the bus latch 1502, and at step 1706, a determination is made whether the data indicates an action is necessary at the processor unit 1002.

If at step 1706, the determination is negatively answered, then the method 1700 proceeds to step 1701, where the processor unit 1002 continues to monitor for incoming messages.

If at step 1706, the determination is affirmatively answered, then the method 1700 proceeds to step 1708.

At step 1708, the processing circuitry of the functional processor unit 1002 updates and/or reconfigures the reconfigurable structure 1504 and/or reducer 1010 associated with the functional processor unit 1002, based on the instruction in the message, as discussed above. In one embodiment, an optional confirmation message may be sent from the functional processor unit 1002 to the controller 1140 upon completion of such reconfiguration. The method 1700 then proceeds to step 1701, where the functional processor unit 1002 continues to monitor for incoming messages from the controller 1140.

Accordingly, a novel method and apparatus has been shown and discussed to enable a processor to monitor a wide range of events, such as the power being consumed by a certain functional unit or the behavior of one of the caches. Collection of events into the digest collector 1130 of the present invention helps reduce the amount of information transmitted, and the dedicated performance bus 1120 ensures that digests 1130 will not contend with other traffic, as occurs in systems with a shared multi-purpose bus. The implementation of the controller 1140 enables the processor units 1002 to be dynamically tuned (i.e., reconfigured or updated) in response to changes in the environment or processor/user requirements.

While the foregoing is directed to embodiments of the present invention, other and further embodiments of the invention may be devised without departing from the basic scope thereof, and the scope thereof is determined by the claims that follow.

The invention claimed is:

1. Apparatus for monitoring event occurrences, comprising:
    at least one logic operator for generating a single cumulative event signal from captured information from a plurality of event signals indicative of respective occurrences of monitored events;
    a register having at least one capture bit with a plurality of storage bits for receiving said single cumulative event signal from said at least one logic operator, wherein said cumulative event signal is received at a first frequency;
    a shift rate controller for generating a shift rate signal, wherein stored information in said at least one capture bit is shifted to one of the plurality of storage bits in accordance with said shift rate signal, wherein said shift rate signal is received by the register at a second frequency; and
    a selector for selecting between a plurality of counting methods, where a first counting method determines whether shifted information from the at least one capture bit of the register is to effect counting by the counter, where a second counting method determines whether shifted information from one of the plurality of storage bits of the register is to effect counting by the counter, and where a third counting method determines whether information directly from the cumulative event signal is to effect counting by the counter.

2. The apparatus of claim 1, further comprising:
    a counter for determining whether shifted information from the register is to effect counting by said counter.

3. The apparatus of claim 2, wherein said second frequency is dependent upon a selectable time interval, and wherein said first frequency is different than said second frequency.

4. The apparatus of claim 2, wherein said counter counts if said shifted information from the register is indicative of an occurrence of a monitored event.

5. The apparatus of claim 2, wherein said shifted information is received from the at least one capture bit of said register.

6. The apparatus of claim 2, wherein said shifted information is received from one of the plurality of storage bits of said register.

7. The apparatus of claim 1, further comprising:
    a counter for determining whether information directly from the cumulative event signal is to effect counting by said counter.

8. The apparatus of claim 7, wherein said counter counts if said information directly from the cumulative event signal is indicative of an occurrence of a monitored event.

9. The apparatus of claim 1, wherein said at least one logic operator comprises at least one of and AND, NAND, OR, NOR, and exclusive OR logic operator.

10. A method for monitoring event occurrences from a plurality of functional processor units at a centralized location via a dedicated bus coupled between said plurality of functional processor units and said centralized location, said method comprising:
    receiving, at said centralized location, data indicative of cumulative events occurring at one of said functional processor units;
    storing said data in a first temporary memory;
    storing said data in a register based on a tag identifier affixed to said data, said tag identifier providing indicia of one of said plurality of functional processor units;
    sending said data to a controller adapted to examine said data to determine whether said one of said plurality of functional processor units is to be reconfigured to operate in a different manner;
    receiving, at said controller, said data collected from said digest controller;
    comparing said collected data to a predetermined value;
    generating an instruction message based on said comparison;
    sending said instruction message to said one of a plurality of functional processor units; and
    affixing an instruction tag to said instruction message, said instruction tag providing indicia of said one of a plurality of functional processor units.

11. The method of claim 10 wherein said data comprises one of a pattern history and a count value.

12. The method of claim 10 further comprising:
    performing an arithmetic-logic operation on said received data prior to storing said data in said register.

13. The method of claim 10 wherein said sending step comprises sending said instruction message and affixed instruction tag over said dedicated bus.

14. The method of claim 10 wherein said reconfiguration of said one of said plurality of functional processor units comprises at least one of changing a manner of counting, changing a history pattern, changing at least one logic operator, initiating or terminating a count, changing at least one threshold, monitor different future event occurrences, and changing a clock rate.

15. The method of claim 10, wherein said data stored in said register is logically combined with a value originating from other functional processor units.

16. A digest collector for centrally monitoring event occurrences at a plurality of functional processor units, said digest collector comprising:
    a bus latch, said bus latch having an input adapted for coupling to a dedicated bus that is coupled to said plurality of functional processor units, said bus latch for collecting data associated with at least one of said plurality of functional processor units;

a register file coupled to an output of said bus latch;

control circuitry, coupled to said bus latch and said register file, said control circuitry for controlling transfer of said data associated with at least one of said plurality of function processor units to said register file;

an arithmetic-logic unit (ALU) coupled to a first output of said bus latch and an input of said register file; and a temporary register file coupled to second output of said bus latch, said temporary register file having an output coupled to said ALU.

17. The digest collector of claim 16, wherein said data comprises a tag identifying a particular functional processor unit.

18. The digest collector of claim 17, wherein said tag comprises indicia of whether to store said data in said register file.

19. The digest collector of claim 16 wherein said bus latch has an input coupled to a dedicated bus shared between said plurality of functional processor units.

20. The digest collector of claim 16 wherein an output of said register is coupled to a controller, said controller adapted to examine said data to determine whether said one of said plurality of functional processor units is to be reconfigured to operate in a different manner.

* * * * *